US00RE43804E

(19) United States
(12) Reissued Patent
Walker et al.

(10) Patent Number: US RE43,804 E
(45) Date of Reissued Patent: Nov. 20, 2012

(54) HAND-HOLDABLE VACUUM CLEANERS

(75) Inventors: Andrew Walker, Newton Hall (GB); Eric Coburn, Coxhoe (GB); David Rowntree, Newton Hall (GB)

(73) Assignee: Black & Decker Inc., Newark, DE (US)

(21) Appl. No.: 13/277,519

(22) Filed: Oct. 20, 2011

Related U.S. Patent Documents

Reissue of:
(64) Patent No.: 7,370,387
Issued: May 13, 2008
Appl. No.: 11/495,742
Filed: Jul. 28, 2006

U.S. Applications:
(63) Continuation of application No. 12/777,358, filed on May 11, 2010, now Pat. No. Re. 42,873.

(30) Foreign Application Priority Data

Aug. 11, 2005 (EP) ..... 05255024

(51) Int. Cl.
*A47L 5/24* (2006.01)
*A47L 5/34* (2006.01)

(52) U.S. Cl. ..... 15/344; 15/354

(58) Field of Classification Search ..... 15/300.1, 15/344, 350, 351, 354
See application file for complete search history.

(56) References Cited

U.S. PATENT DOCUMENTS 4,573,237 A 3/1986 Kochte et al.
(Continued)

FOREIGN PATENT DOCUMENTS

EP 1 752 076 A1 2/2007
(Continued)

*Primary Examiner* — David B Thomas
(74) *Attorney, Agent, or Firm* — Harness, Dickey & Pierce, P.L.C.

(57) ABSTRACT

There is provided a hand-holdable vacuum cleaner, comprising: an electric motor, an electrical on-off switch for operating said motor; a fan connected to an output shaft of said motor; an airflow pathway comprising an inlet for dirty air, an outlet for clean air, and a collection chamber located in fluid communication between said inlet and said outlet; means for separating out debris entrained with dirty air entering via said inlet and depositing the debris in said collection chamber; and means for adjusting an angle of said inlet relative to a main axis of said vacuum cleaner; wherein the vacuum cleaner further comprises a rigid, elongate nose having said inlet at one end thereof, said nose being pivotable relative to said main axis through an angle of at least 135 degrees. The elongate nose can be pivoted from a first, folded position in which it is angled alongside the main axis of the vacuum cleaner, substantially parallel thereto, allowing the vacuum cleaner to be stored in a very compact overall space, to a second, extended position in which it is angled by only a small amount or not at all from the main axis of the vacuum cleaner to provide an extension thereof. Secondly, since the nose is rigid and elongate and has the dirty air inlet located at one end thereof, it may be introduced into narrow spaces without any need to be supported by a hand of a user, unlike a flexible hose extension known from prior art hand-holdable vacuum cleaners.

16 Claims, 5 Drawing Sheets

U.S. PATENT DOCUMENTS

| | | | | |
|---|---|---|---|---|
| 4,610,048 | A | 9/1986 | Ishihara et al. | |
| 5,377,383 | A | 1/1995 | Christensen | |
| 5,440,781 | A | 8/1995 | Kitazawa et al. | |
| 6,108,864 | A | 8/2000 | Thomas et al. | |
| 6,684,451 | B2 * | 2/2004 | Kato et al. | 15/319 |
| 2004/0088820 | A1 * | 5/2004 | Kato et al. | 15/351 |

FOREIGN PATENT DOCUMENTS

| | | | |
|---|---|---|---|
| GB | 371531 | A | 4/1932 |
| JP | 2001-112681 | A | 4/2001 |

* cited by examiner

HAND-HOLDABLE VACUUM CLEANERS

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a continuation of U.S. application Ser. No. 12/777,358, filed May 11, 2010, which is a Reissue of U.S. Pat. No. 7,370,387 B2, issued May 13, 2008, which claims priority to European Patent Application Serial No. 05255024.1, filed Aug. 11, 2006.*

FIELD OF THE INVENTION

The present invention relates to hand-holdable vacuum cleaners. Such vacuum cleaners are well known for collecting dust and dirt, although wet-and-dry variants which can collect spilled liquids as well are also known. Typically, they are intended for use in a domestic environment, although they also find uses in other environments, such as worksites. Generally, hand-holdable vacuum cleaners are electrically powered and comprise an electric motor, an electrical on-off switch for a user to operate said motor, a fan connected to an output shaft of said motor, an inlet for dirty air, an outlet for clean air and a collection chamber for dust, dirt and possibly also liquids. Electrical power for the motor may be provided by a source of mains electricity, in which case the vacuum cleaner will further comprise an electrical power cable, by a removable and replaceable battery pack, or by one or more in-built rechargeable cells, in which case the vacuum cleaner will further comprise some means, such as a jack plug, for connecting the vacuum cleaner to a recharging unit. When the vacuum cleaner is provided with electrical power from one of these sources and the on-off switch is set to the "on" position, the electric motor drives the fan to draw dirty air along an airflow pathway in through the dirty air inlet, via the collection chamber to the clean air outlet. Interposed at some point along the airflow pathway, there is also provided some means for separating out dust and dirt (and possibly also liquids) entrained with the dirty air and depositing these in the collection chamber. This separation means may comprise one or more filters and/or a cyclonic separation device. An example of such a hand-holdable vacuum cleaner in which the separation means comprises a filter is disclosed in European patent application no. EP 1 523 916 in the name of the present applicant.

BACKGROUND OF THE INVENTION

More specifically, the present invention relates to hand-holdable vacuum cleaners comprising a component part which can be adjusted to allow the dirty air inlet of the vacuum cleaner to be pointed in different directions, whilst a user of the vacuum cleaner is able to hold the vacuum cleaner in the same orientation. This has the advantages that the vacuum cleaner may be used to access awkward spaces and can be held more comfortably by orienting a main axis of the vacuum cleaner to suit the user and adjusting the position of the dirty air inlet to be in proximity to a surface to be cleaned, rather than orienting the main axis of the vacuum cleaner to best suit the surface to be cleaned and requiring the user to hold the vacuum cleaner in whichever orientation this demands. A hand-holdable vacuum cleaner of this type, which has a pivotable nose comprising the dirty air inlet, is disclosed in U.S. Pat. No. 4,573,237.

Hand-holdable vacuum cleaners provided with a flexible hose attachment which give the same advantages as these are also known. An example of a hand-holdable vacuum cleaner with such a flexible hose attachment is described in German utility model no. DE 203 14 544 U. However, these vacuum cleaners have other disadvantages over vacuum cleaners of the type disclosed in U.S. Pat. No. 4,573,237, which are as follows. Firstly, the hose attachment must either be stored on the vacuum cleaner itself, as in DE 203 14 544 U, which takes up valuable room, or if it is removable, it must be stored elsewhere, in which case it may become lost or may not be readily to hand when required. Secondly, the flexible hose attachment must be supported in use by a hand of a user.

However, whereas vacuum cleaners of the type disclosed in U.S. Pat. No. 4,573,237 are advantageous for these reasons over hand-holdable vacuum cleaners provided with a flexible hose attachment, there is still room for considerable improvement over the type of vacuum cleaner disclosed in U.S. Pat. No. 4,573,237. Specifically, in spite of the disadvantages of flexible hose attachments just stated, a flexible hose attachment can access a wider range of angles than a vacuum cleaner of the type disclosed in U.S. Pat. No. 4,573,237 and can also access narrower spaces in comparison thereto.

BRIEF SUMMARY OF THE INVENTION

Accordingly, the present invention has as its object the provision of an improved hand-holdable vacuum cleaner comprising means for adjusting an angle of the dirty air inlet thereof relative to a main axis of the vacuum cleaner, which has improved reach in comparison to a vacuum cleaner of the type disclosed in U.S. Pat. No. 4,573,237, but which need not comprise a flexible hose attachment to achieve the same.

The present invention aims to achieve this object by providing a hand-holdable vacuum cleaner comprising an electric motor; an electrical on-off switch for operating said motor; a fan connected to an output shaft of said motor; an airflow pathway comprising an inlet for dirty air, an outlet for clean air, and a collection chamber located in fluid communication between said inlet and said outlet; means for separating out debris entrained with dirty air entering via said inlet and depositing the debris in said collection chamber; and means for adjusting an angle of said inlet relative to a main axis of said vacuum cleaner; further comprising a rigid, elongate nose having said inlet at one end thereof, said nose being pivotable relative to said main axis through an angle of at least 135 degrees.

A hand-holdable vacuum cleaner with these features has several advantages, as follows. Firstly, the elongate nose may be pivoted from a first, folded position in which it is angled alongside the main axis of the vacuum cleaner, allowing the vacuum cleaner to be stored in a very compact overall space, to a second, extended position in which it is angled by only a small amount or not at all to the main axis of the vacuum cleaner to provide an extension thereof. Secondly, since the nose is rigid and elongate and has the dirty air inlet located at one end thereof, it may be introduced into narrow spaces without any need to be supported by a hand of a user. This is advantageous over a flexible hose attachment of the prior art, which must be supported by a hand of a user and consequently cannot be introduced into spaces which are too narrow or awkward to provide access to a human hand. Thirdly, since the nose can pivot through an angle relative to the main axis of the vacuum cleaner of at least 135 degrees, this allows the vacuum cleaner to be held comfortably by a user in a single orientation, but have the dirty air inlet thereof directed in a very wide variety of different directions.

Preferably, the nose is pivotable relative to the main axis of the vacuum cleaner through an angle of more than 180 degrees. This allows the nose not only to be bent at an acute or obtuse angle relative to the main axis of the vacuum cleaner, but also at a reflex angle, allowing the vacuum cleaner to be held by a user in the same orientation as for acute and obtuse angles, but for the dirty air inlet to be directed upwardly towards the user, which allows the vacuum cleaner to be comfortably used for cleaning under furniture, for example.

It is also desirable that the pivotable nose can be releasably engaged in one or more fixed positions throughout its full range of angles of pivot, for example in the folded-back position of 0 degrees, in the straight-line position of 180 degrees and in a number of other positions such as 45, 90, 135, 225 and 270 degrees. This can be achieved by providing the pivotable nose or a part of the vacuum cleaner rigidly connected thereto with first engagement means and a part of the vacuum cleaner rigidly connected to a main body thereof housing the motor and the fan with second engagement means adapted to engage with the first engagement means, and also by providing the vacuum cleaner with a resiliently [□iased] *biased* button which a user can depress to disengage the first engagement means from the second engagement means, thereby releasing the pivotable nose from engagement in one of the aforementioned positions.

In a preferred embodiment which gives the vacuum cleaner even greater access to restricted spaces, the nose can further comprise a rigid telescopic extension tube. Such an extension tube on the nose of a hand-holdable vacuum cleaner is known, for example, from U.S. Pat. No. 4,610,048 and international patent publication no. WO2004/069021. However, the combination of such an extension tube with a nose which can pivot through an angle relative to the main axis of the vacuum cleaner of at least 135 degrees is not known from the prior art and gives the vacuum cleaner greatly increased versatility in its ability to access awkward spaces.

The separating means of the vacuum cleaner may comprise one or more filters and/or a cyclonic separation device. In a preferred embodiment, the separating means comprises a filter located within the collection chamber, and the collection chamber has a substantially cylindrical shape about a central axis oriented at right angles to the main axis of the vacuum cleaner, with the filter arranged in an axially symmetric fashion concentric with the central axis of the collection chamber. In this embodiment, the pivotable nose is also arranged to pivot about the central axis of the collection chamber and a dirty air outlet from the nose is arranged to enter the collection chamber on a cylindrical side wall thereof. Finally, the clean air outlet from the collection chamber is located within said filter. Thus during operation of the vacuum cleaner of this embodiment, dirty air enters the collection chamber from the dirty air outlet of the nose at a tangent to the cylindrical side wall of the collection chamber regardless of the angle of the pivotable nose relative to the main axis of the vacuum cleaner, and swirls around the centrally located filter which separates out dust and dirt entrained with the dirty air and deposits these in the collection chamber, before the clean air exits the collection chamber from the clean air outlet located within the filter. This arrangement has several advantages, as follows. Firstly, before it enters the collection chamber, the dirty air travels in a straight line regardless of the angle of the pivotable nose, which has the effect of maximising the velocity of the dirty air and minimising turbulence, therefore improving the vacuum cleaner's ability to pick up dirt. Secondly, the dirty air always enters the collection chamber tangentially and since the collection chamber has a substantially cylindrical shape, this enables the collection chamber to act as a cyclonic separator, flinging the entrained dirt outwards centrifugally as it swirls around the centrally located filter. This cyclonic separation aids the operation of the filter and may be optimised still further by the filter being provided with a conical or frusto-conical shape, which helps to separate out different sizes of dirt particle at different locations along the central axis of the filter.

In a further preferred embodiment of the embodiment of the vacuum cleaner just described, the collection chamber comprises a hinged door on an end face thereof opposite to said clean air outlet. This allows the collection chamber to be emptied of accumulated dust and dirt by a user merely opening the hinged door and tipping the contents of the collection chamber out. This has the advantage that the user does not have to touch either the dust and dirt or any components of the vacuum cleaner which come into contact with dust and dirt in order to empty the vacuum cleaner.

Preferably the door is held by a main body of the vacuum cleaner which houses the motor and the fan. Thus the door maintains the same orientation relative to the main body of the vacuum cleaner regardless of the angle of the pivotable nose. This is more convenient and less confusing for a user.

If the door is held by the main body of the vacuum cleaner in this fashion, it is also preferable for the filter located within the collection chamber to be rotatable relative to the door when the nose is pivoted and for an interior face of the door to be provided with a series of radial tangs and for an end face of the filter adjacent to the interior face of the door to have a corresponding set of radial tangs. If the combined height of the tangs on the interior face of the door and on the end face of the filter is greater than the separation between the interior face of the door and the end face of the filter, the two facing sets of tangs will overlap each other, such that when the pivotable nose is rotated relative to main axis of the vacuum cleaner, the tangs of the filter will engage with the tangs on the door and agitate the filter, thereby dislodging dust and dirt adhering to the filter and causing it to be deposited in the collection chamber. This filter cleaning mechanism has the advantage that it allows the filter to be cleaned by a user merely pivoting the nose of the vacuum cleaner relative to the main body thereof and without the need to touch the dirty filter at all.

Alternatively, the same filter cleaning effect may be achieved by the filter being held immovable relative to the main body of the vacuum cleaner during operation and the door being rotatable relative to the filter when the nose is pivoted, provided that sets of opposing tangs are provided on the interior face of the door and on the end face of the filter in a similar fashion.

Alternatively, the collection chamber may comprise a door on the cylindrical side wall thereof instead of on an end face thereof opposite to the clean air outlet. This is less preferred because the collection chamber is less easy to empty and the door opening mechanism may interfere with rotation of the pivotable nose. However, in this case, the same filter cleaning effect may be achieved by providing a series of radial tangs on the end face of the collection chamber opposite to the clean air outlet instead of on the door.

All of the above alternative arrangements for filter cleaning are unified by the common inventive concept of opposing and overlapping sets of radial tangs provided on the filter and on another part of the vacuum cleaner which are caused to rotate relative to each other when the nose of the vacuum cleaner is pivoted in order to agitate the filter. However, in yet another alternative arrangement of a filter cleaning mechanism, regardless of whether a door is located on the end face of the collection chamber opposite to the clean air outlet or on the cylindrical side wall thereof, instead of the set of radial tangs on the filter and the set of tangs on another part of the vacuum cleaner being caused to rotate relative to each other when the nose is pivoted, one of the sets of tangs may instead be coupled to a filter cleaning wheel which a user can rotate in order to cause the set of tangs coupled thereto to rotate relative to the other set of tangs, in the manner already disclosed in EP 1 523 916 in the name of the present applicant.

Notwithstanding the foregoing, the filter may still be removable and replaceable when the vacuum cleaner is not in use, so that a worn, damaged or permanently clogged filter may be substituted by a new one.

The filter may also comprise a plurality of filter elements, such as a course filter for filtering larger particles of dirt and a fine filter contained therein for filtering finer particles of dust from the airflow pathway. The filter elements may themselves be independently removable and replaceable.

In embodiments in which the collection chamber has a substantially cylindrical shape about a central axis oriented at right angles to the main axis of the vacuum cleaner, it is also preferable for the motor and the fan to be oriented in the main body of the vacuum cleaner with the output shaft of the motor and the fan's axis of rotation parallel to the central axis of the collection chamber and at right angles to the main axis of the vacuum cleaner. This is in contrast to the conventional orientation of the motor and the fan in a hand-holdable vacuum cleaner, which is usually along or parallel to the main axis of the vacuum cleaner (as in, for example, EP 1 523 916). This new arrangement has several advantages over the conventional layout, as follows. Firstly, it is beneficial for the overall compactness of the vacuum cleaner, considering that the collection chamber is already oriented at right angles to the main axis of the vacuum cleaner. Secondly, it means that the fan can be located on the same side of the vacuum cleaner as the clean air outlet from the collection chamber and in close proximity thereto, thereby shortening the airflow pathway between these two components, which improves the overall speed and efficiency of the vacuum cleaner in operation. Thirdly, if the fan is configured as an impeller which draws air in axially thereto and expels air out radially therefrom, the main body of the vacuum cleaner can also be provided with one or more exhaust vents on the rear of the main body, i.e. in a location opposite to the dirty air inlet of the pivotable nose when the nose is in its fully extended or 180-degree position. In this way, air expelled by the fan will travel in a straight-line path from the fan to the exhaust vents without having to be directed around any corners, but is nonetheless also directed away from a surface to be cleaned in completely the opposite direction to the dirty air inlet to the nose, which avoids disturbing dust and dirt on the surface to be cleaned with the exhausted air. The same desirable objective of not disturbing dust and dirt on a surface to be cleaned with clean air from the exhaust vents on a hand-holdable vacuum cleaner of a conventional layout can only be achieved if the exhaust vents are also located on the rear of the main body of the vacuum cleaner. However in this case, air expelled by the impeller has to be directed around one or more corners within the body in order to reach the exhaust vents, since the orientation of the fan's axis of rotation parallel to the main axis of the vacuum cleaner means that the fan expels air at right angles to the main axis, sideways to the main body. This both increases the length of the airflow pathway between the fan and the exhaust vents in the conventional arrangement and also increases the turbulence of the exhausted air. Accordingly, the proposed new arrangement has improved speed and efficiency of airflow in comparison thereto, as well as reduced noise, which is generated by turbulent air.

In another preferred embodiment, the vacuum cleaner may be adapted to stand on the rear end of the main body of the vacuum cleaner. This allows the vacuum cleaner to be stood in a very small surface area, and if the nose is pivoted to its folded-back position at 0 degrees to the main axis of the vacuum cleaner, this can be achieved without the vacuum cleaner having an excessive height. Moreover, if the vacuum cleaner is a rechargeable model, the rear end of the main body of the vacuum cleaner can also be provided with means for connecting the vacuum cleaner to a recharging unit, such as a jack plug, which allows the vacuum cleaner to be stood on its rear end on a recharging unit also occupying a small surface area.

Finally, the nose of the vacuum cleaner may be provided with an one-way valve in the form of a flap composed of a resilient material, such as rubber, which allows dirty air to enter the nose via the dirty air inlet when the vacuum cleaner is in operation, but which prevents dust and dirt from leaving the nose via the dirty air inlet under the influence of gravity if the nose is directed downwards when the vacuum cleaner is not in operation. Such a one-way valve in the form of a rubber flap is known from conventional hand-holdable vacuum cleaners, but is particularly desirable in embodiments of the present vacuum cleaner, considering that it is likely to be stored with the pivotable nose directed downwards when the vacuum cleaner is not in operation.

BRIEF DESCRIPTION OF THE DRAWINGS

Further features and advantages of the present invention will be better understood from the following detailed description, which is given by way of example and in association with the accompanying drawings, in which.

DETAILED DESCRIPTION OF THE DRAWINGS

Figure 1A:
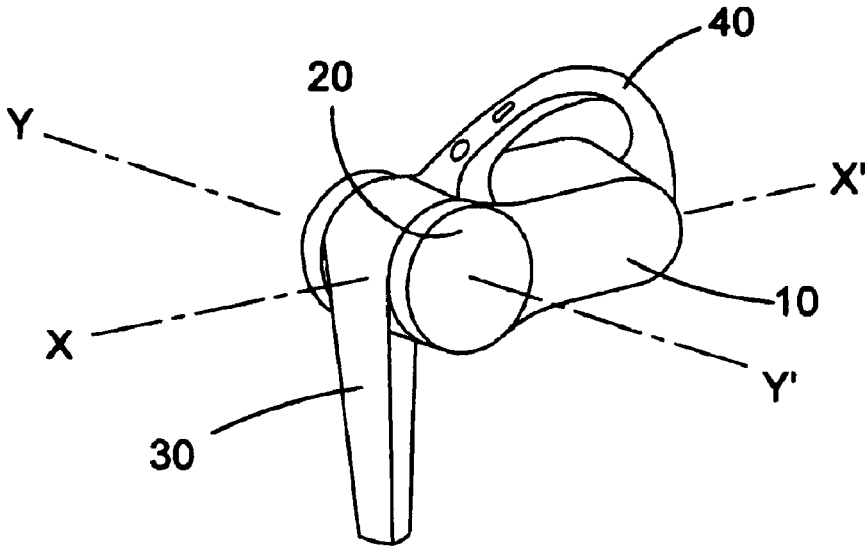
FIGS. 1A, 1B, 1C and 1D are schematic perspective views of a hand-holdable vacuum cleaner according to a first embodiment of the invention, respectively showing the pivotable nose thereof in 90, 180, 210 and 0 degree positions relative to the main axis of the vacuum cleaner.

Referring firstly to FIGS. 1A, 1B, 1C and 1D of the accompanying drawings, these show a hand-holdable vacuum cleaner according to a first embodiment of the invention, comprising a main body 10, a collection chamber 20 for dust and dirt, a rigid, elongate nose 30 and a handle 40. The nose 30 has an inlet 32 for dirty air located at one end thereof. Mounted on handle 40 is an electrical on-off switch 42 for operating an electric motor housed within main body 10. In this embodiment, switch 42 has three settings, namely a first position for switching the motor off, a second position for low-speed operation of the motor and a third position for high-speed operation of the motor.

Figure 1B:
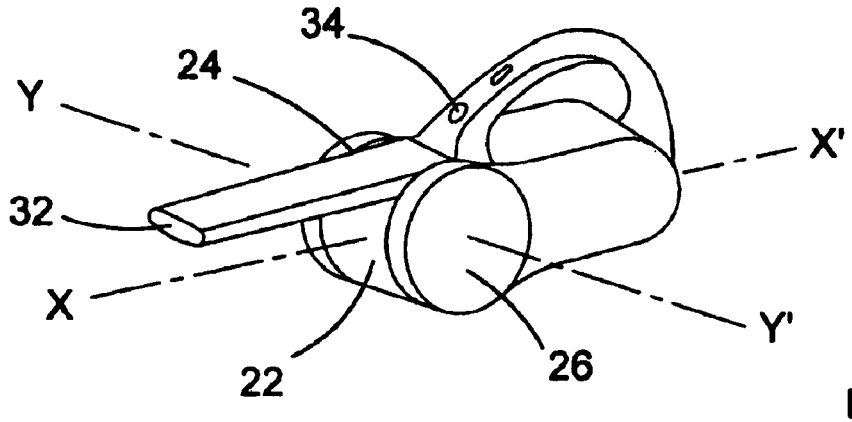
Figure 1C:
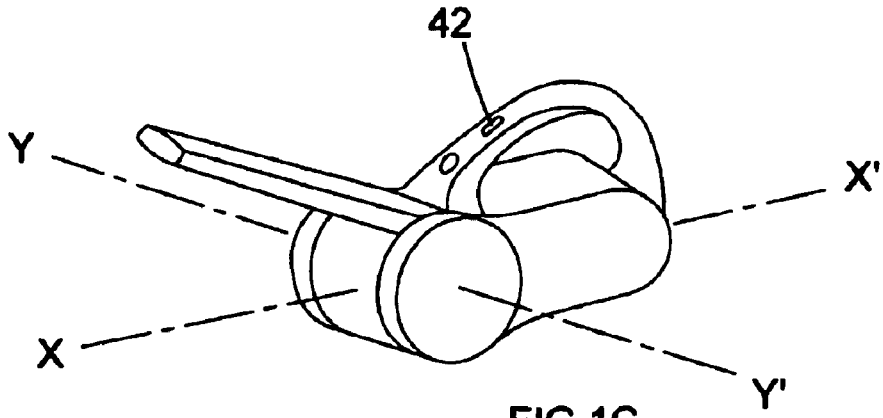
Figure 1D:
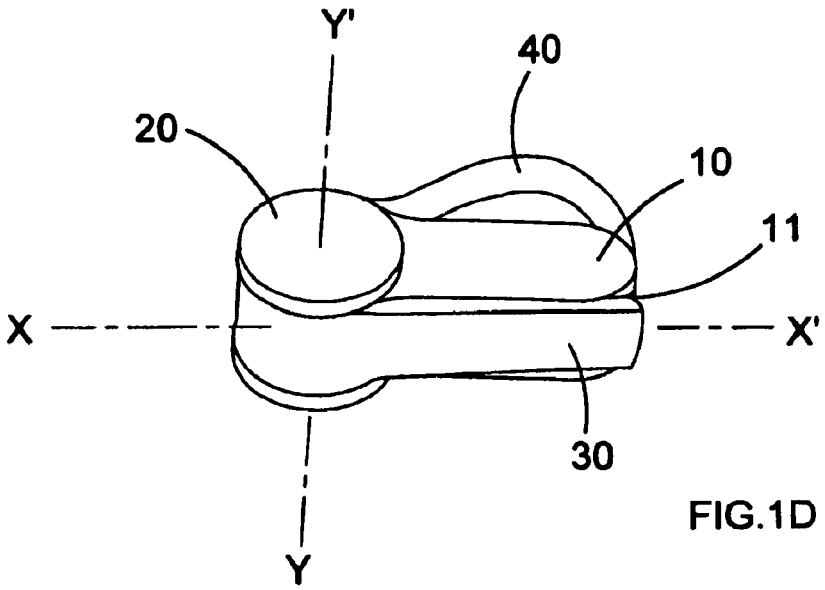

In all of FIGS. 1A, 1B, 1C and 1D, broken line X-X' represents a main axis of the vacuum cleaner and broken line Y-Y' represents a central axis of the collection chamber 20, which in this embodiment has a substantially cylindrical shape. Central axis Y-Y' of the collection chamber 20 is oriented at right angles to the main axis X-X' of the vacuum cleaner. As can be seen from these four figures, the elongate nose 30 is pivotable about axis Y-Y' through a range of angles from 0 degrees (as shown in FIG. 1D) through acute angles up to 90 degrees (as shown in FIG. 1A) through obtuse angles between 90 and 180 degrees (the latter of which is shown in FIG. 1B) and up to a reflex angle of 210 degrees (as shown in FIG. 1C). Thus in this embodiment, nose 30 is pivotable through a range of angles relative to the main axis X-X' of more than 180 degrees. With the nose pivoted to the reflex angle shown in FIG. 1C, this allows the vacuum cleaner to be comfortably used for cleaning under furniture. On the other hand, with the nose folded back to the 0 degree position shown in FIG. 1D, the vacuum cleaner can also be stored in a very compact space. The underside of main body 10 is also provided with a corresponding groove 11 for receiving nozzle 30 in this folded-back position. This improves the overall compactness of the vacuum cleaner for storage still further. With the nose positioned at an inbetween angle, as shown in FIG. 1A, the vacuum cleaner can be used for cleaning in gaps between objects, but can still be held in a comfortable orientation by a user.

In this embodiment, the nose 30 is rigidly connected to a central portion 22 of the collection chamber 20. End faces 24, 26 of the collection chamber on the other hand are rigidly connected to the main body 10 of the vacuum cleaner, so that as nose 30 pivots about axis Y-Y', central portion 22 of the collection chamber 20 rotates relative to the end faces 24, 26. The outer surface of central portion 22 is provided with two sets of teeth on each end thereof adjacent end faces 24 and 26, and the inner surfaces of end faces 24, 26 are each provided with second sets of teeth which are adapted to engage with respective ones of the two sets of teeth provided on central portion 22. Accordingly, nose 30 cannot pivot relative to main body 10 because the interengaging sets of teeth prevent movement of central portion 22 relative to end faces 24, 26. However, mounted on handle 40, in addition to electrical on-off switch 42, is a further button 34, which is resiliently biassed and which when depressed by a user, will disengage the sets of teeth mounted on end faces 24, 26 from the two sets of teeth provided on central portion 22, thereby allowing nose 30 to pivot freely relative to main body 10. Nose 30 can therefore be locked in position at whatever angle the user desires from across the full range of angles available for the nose to pivot through, until such time as the user wishes to unlock the nose and adjust it to a new angle by depressing button 34.

Figure 2A:
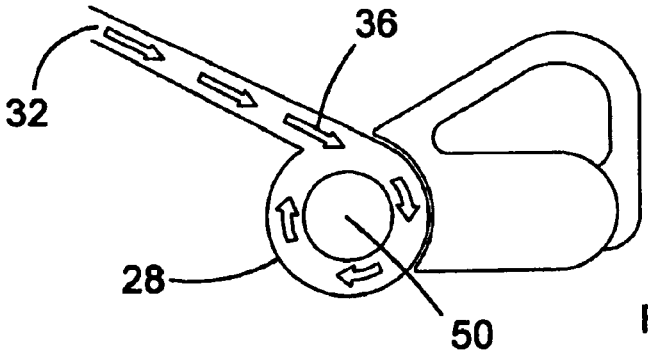
FIGS. 2A, 2B and 2C are schematic side views of a hand-holdable vacuum cleaner according to a second embodiment of the invention, respectively showing the pivotable nose thereof in 210, 135 and 160 degree positions relative to the main axis of the vacuum cleaner.
Figure 2B:
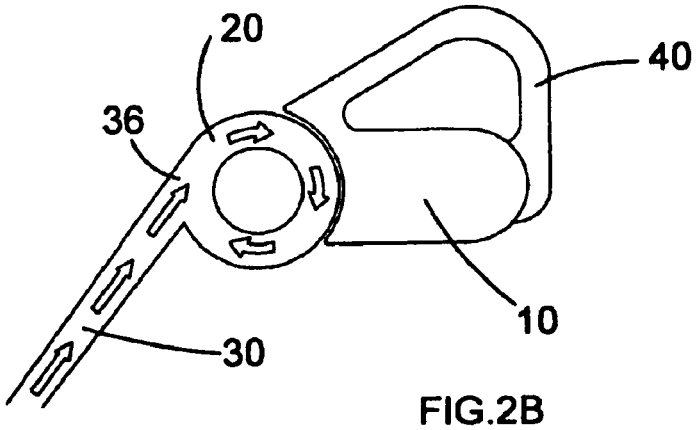
Figure 2C:
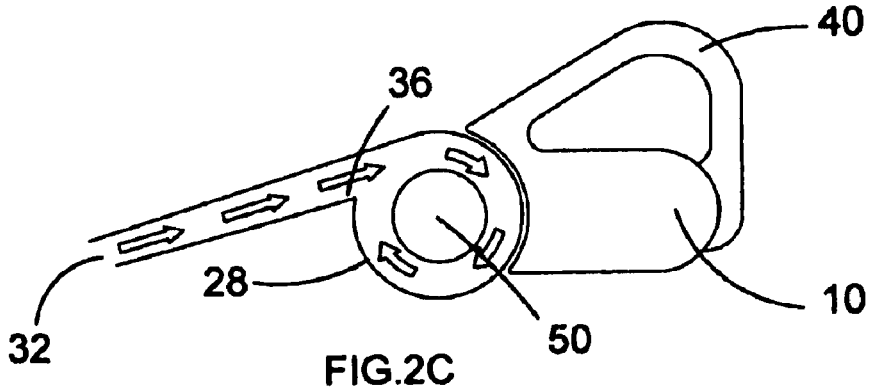

FIGS. 2A, 2B and 2C show a hand-holdable vacuum cleaner according to a second embodiment of the invention, in which the collection chamber 20 has a substantially cylindrical shape and a filter 50 is located within the collection chamber, arranged in an axially symmetric fashion concentric with the central axis Y-Y' of the collection chamber. Since FIGS. 2A, 2B and 2C are side elevational views, they all show axis Y-Y' of the collection chamber and the filter 50 end-on. In this embodiment, nose 30 is also arranged to pivot about the central axis Y-Y' and a dirty air outlet 36 from nose 30 enters the collection chamber 20 on a cylindrical side wall 28 thereof. Thus as FIGS. 2A, 2B and 2C show, regardless of the angle of nose 30 relative to main body 10, dirty air always enters the collection chamber 20 from dirty air outlet 36 at a tangent to cylindrical side wall 28, and swirls around centrally located filter 50 in the manner indicated by the arrows in FIGS. 2A, 2B and 2C. This separates out dust and dirt entrained with the dirty air and deposits them in the collection chamber 20, before clean air exits the collection chamber from within the filter via a clean air outlet located on the opposite side from the end face of filter 50 visible in FIGS. 2A, 2B and 2C.

Figure 3:
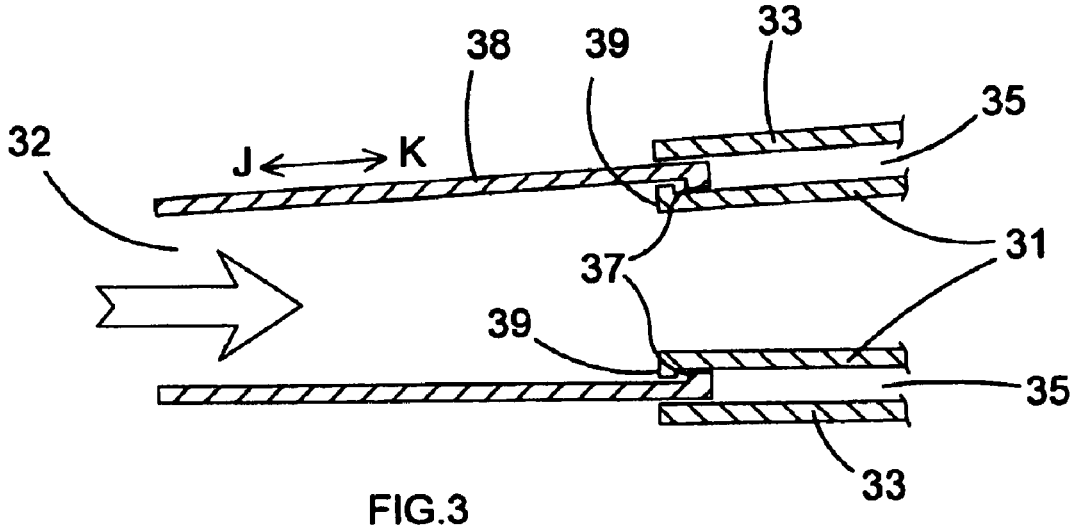
FIG. 3 is a longitudinal cross-section through the nose of a hand-holdable vacuum cleaner according to a third embodiment of the invention, showing a telescopic extension tube thereof.

FIG. 3 shows a third embodiment of the invention, in which nose 30 comprises a rigid telescopic extension tube 38, which dirty air enters in the direction indicated by arrow A in FIG. 3 during operation of the vacuum cleaner. In this embodiment, nose 30 also comprises an inner tube 31 and an outer tube 33. Telescopic extension tube 38 can therefore slide within a space 35 provided between inner and outer tubes 31, 33 in the directions indicated by double-headed arrow J-K in FIG. 3, but is prevented from being removed from space 35 completely by end stops 37 which abut against corresponding lips 39 provided on inner tube 31. In this way, the overall length of nose 30 may be adjusted by a user by sliding extension tube 38 to a location where dirty air inlet 32 is positioned as required. Extension tube 38 has a larger transverse cross-sectional area than inner tube 31. This decreasing cross-sectional area in the direction of the airflow during operation of the vacuum cleaner ensures that use of extension tube 38 does not cause a corresponding drop in air pressure. It is also beneficial for avoiding dirt becoming trapped at the interface between extension tube 38 and inner tube 31, in comparison to the converse arrangement, in which the cross sectional area of inner tube 31 would be larger than the cross-sectional area of extension tube 38. On the other hand, outer tube 33 is provided in addition to inner tube 31 largely for aesthetic reasons: firstly in order to create an outward impression of decreasing cross-sectional area towards dirty air inlet 32 (which looks more natural to the human eye), and secondly to cover any scratches on the outer surface of inner tube 31 which may be created by repeated sliding of extension tube 38 over the outer surface of inner tube 31.

Figure 4:
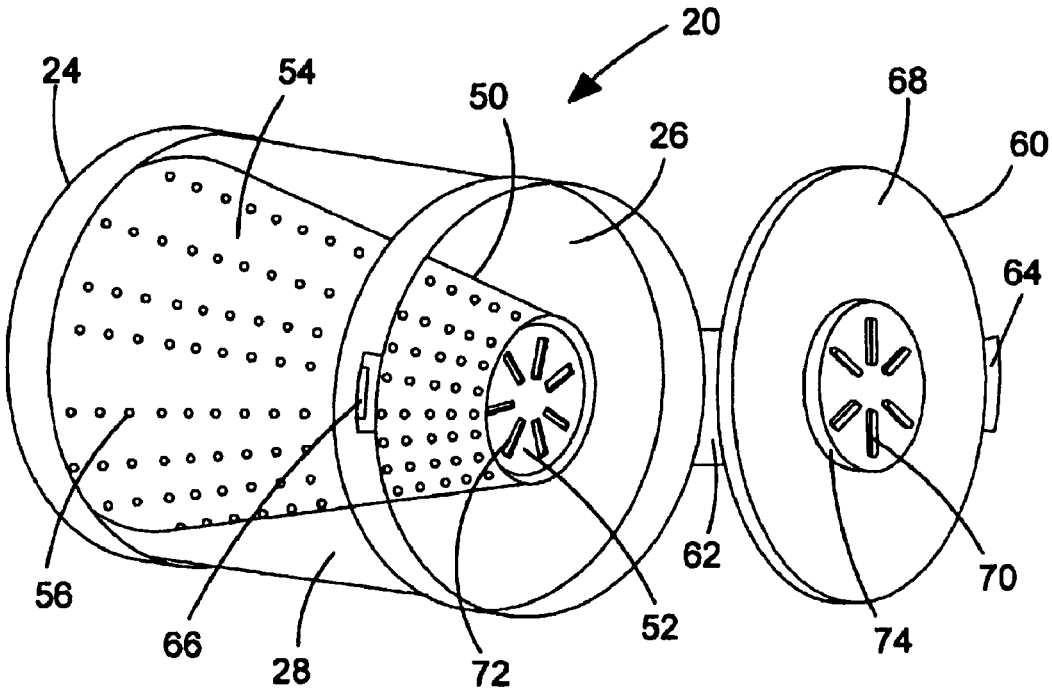
FIG. 4 is a schematic perspective view of the collection chamber of a hand-holdable vacuum cleaner according to a fourth embodiment of the invention, having a hinged door and shown with the door in an open condition.

FIG. 4 shows the collection chamber 20 of a hand-holdable vacuum cleaner according to a fourth embodiment of the invention. In this embodiment, the collection chamber has a substantially cylindrical shape and comprises end faces 24, 26 and a cylindrical side wall 28. Arranged in an axially symmetric fashion concentric with the central axis of the collection chamber is a filter 50. Filter 50 has a frustoconical shape and comprises an end face 52 and a conical side wall 54. End face 52 is impervious to air, but conical side wall 54 is provided with a plurality of fine pores 56 through which air can pass. A clean air outlet from collection chamber 20 is located within filter 50, allowing air to exit the collection chamber through end face 24. Thus during operation of the vacuum cleaner, dirty air enters the collection chamber at a tangent to cylindrical side wall 28 and swirls around filter 50. The entrained dirt is flung outwardly as it swirls around filter 50 under the action of centrifugal force, strikes side wall 28 and is deposited in collection chamber 20. Side wall 28 is transparent, allowing a user to see how much dirt has accumulated within the collection chamber and therefore when it needs emptying. The frusto-conical shape of filter 50 helps to separate out different sizes of dirt particle from the dirty air at different locations along the central axis of the filter, which in turn helps to prevent the filter pores 56 from becoming blocked. Clean air is then able to pass through pores 56 and thence to the clean air outlet from collection chamber 20 located within filter 50.

A user can gain access to collection chamber 20 to empty the accumulated dust and dirt therefrom by means of a door 60 mounted on end face 26 opposite to said clean air outlet. Door 60, which is shown in an open condition in FIG. 4, opens by means of a hinge 62 which connects it to collection chamber 20. However in an alternative embodiment, hinge 62 may instead connect door 60 to a main body 10 of the vacuum cleaner, in which case door 60 will maintain the same orientation relative to main body 10 regardless of the orientation of collection chamber 20 relative thereto. Door 60 can also be securely closed by means of a latch 64 mounted thereon. This latch interengages with a catch 66 provided in a suitable location on end face 26 of collection chamber 20. The locations of latch 64 and catch 66 may however be interchanged as between the door 60 and the collection chamber 20.

Figure 5:
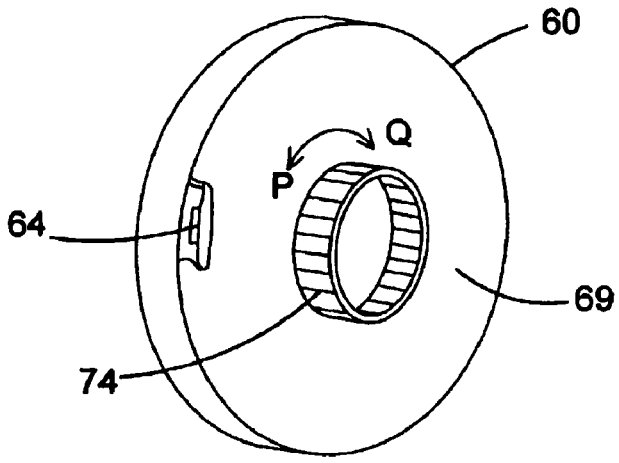
FIG. 5 is a schematic perspective view of an exterior face of the door shown in FIG. 4.

In this embodiment, an interior face 68 of door 60 is provided with a series of radial tangs 70. These tangs 70 cooperate with a corresponding set of radial tangs 72 provided on the end face 52 of filter 50. The combined height of tangs 70 and 72 is greater than the separation between the interior face 68 of the door 60 and the end face 52 of the filter 50, so that the two facing sets of tangs 70,72 will overlap each other when door 60 is in a closed condition. Tangs 70 are coupled to a filter cleaning wheel 74 which is movable within door 60, such that it can be rotated relative thereto. As can be seen in FIG. 5, which shows an exterior face 69 of the door 60 of FIG. 4, filter cleaning wheel 74 projects outwardly of door 60 and is provided with a knurled outer surface. A user can therefore grip this knurled surface and rotate filter cleaning wheel 74 relative to door 60 in either of the directions indicated in FIG. 5 by double-headed arrow P-Q. This has the effect of rotating tangs 70 relative to door 60 and also relative to the set of tangs 72 on end face 52 of filter 50, which is held immovable in collection chamber 20 and is therefore unable to rotate relative thereto. As the tangs 70 are rotated, they engage with tangs 72 and agitate filter 50, thereby dislodging dust and dirt adhering to the filter and causing it to be deposited in collection chamber 20.

In an alternative embodiment not shown in FIGS. 4 and 5, tangs 70 may instead be rigidly mounted to door 60 and unable to rotate relative thereto, but the door itself may be rotatable relative to the immovable filter 50 when a nose of the vacuum cleaner is pivoted in the manner described previously in relation to FIGS. 1A, 1B, 1C and 1D. This dispenses with the need for filter cleaning wheel 74 and means that in this alternative embodiment, tangs 70 will engage with tangs 72 and agitate filter 50 whenever the nose of the vacuum cleaner is pivoted. In another alternative embodiment also not shown in FIGS. 4 and 5, filter 50 may instead be free to rotate within collection chamber 20 whenever the nose of the vacuum cleaner is pivoted and door 60 may instead be held immovable relative to the main body of the vacuum cleaner. This other alternative embodiment, which also dispenses with the need for filter cleaning wheel 74, also means that tangs 70 will engage with tangs 72 and agitate filter 50 whenever the nose of the vacuum cleaner is pivoted. In both of these alternative embodiments, therefore, filter 50 is cleaned automatically during normal use of the vacuum cleaner by pivoting of the nose thereof, without a user having to pay particular attention to performing a filter cleaning operation.

In a still further alternative embodiment also not shown in the figures, the door may instead be provided on the cylindrical side wall 28 of collection chamber 20, and may, for example, be a sliding, rather than a hinged door, thereby allowing a user to gain access to collection chamber 20 to empty dust and dirt therefrom. In this further alternative embodiment, only one of end face 26 and filter 50 is caused to rotate when a nose of the vacuum cleaner is pivoted, but the other of the end face 26 and filter 50 is held immovable, so that filter 50 and end face 26 are rotated relative to each other when the nose is pivoted. This alternative embodiment therefore also dispenses with the need for filter cleaning wheel 74, and means that the tangs 70 will engage with tangs 72 and agitate filter 50 whenever the nose of the vacuum cleaner is pivoted.

Figure 6:
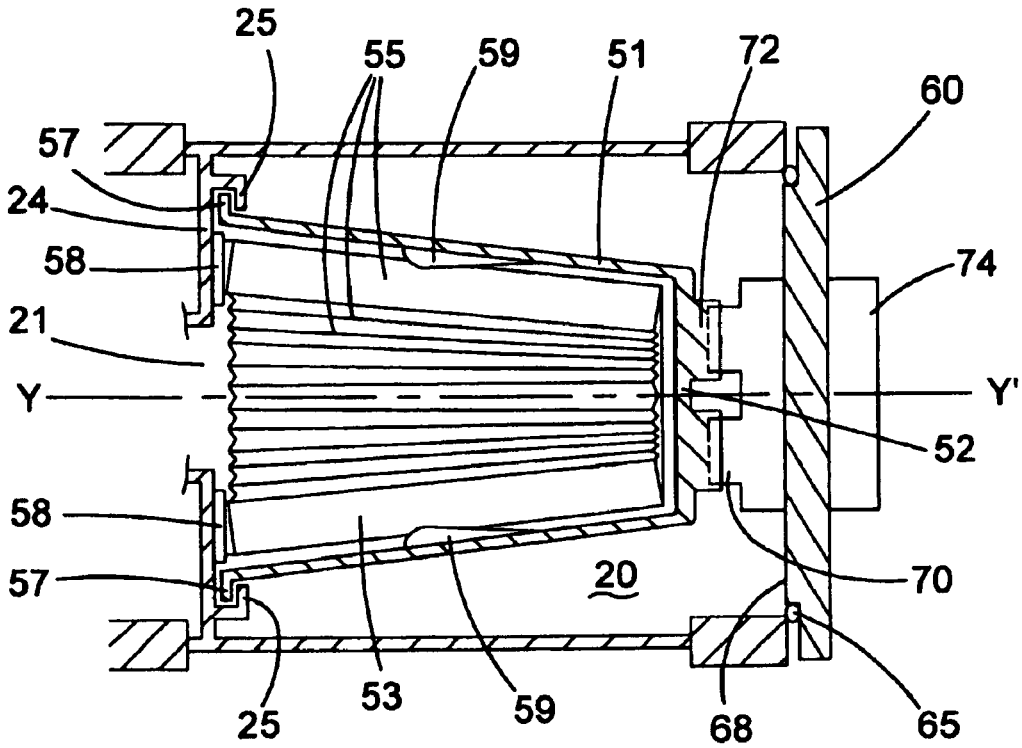
FIG. 6 is a longitudinal cross-section through the collection chamber of a hand-holdable vacuum cleaner according to a fifth embodiment of the invention.

Referring now to FIG. 6, there is shown yet another alternative embodiment in which filter cleaning is effected by means of a filter cleaning wheel 74 which a user can rotate about central axis Y-Y' of collection chamber 20. In this embodiment, filter 50 comprises a course filter element 51 and a fine filter element 53. Course filter element 51 is typically made of a stiff plastics material and is provided with a plurality of fine pores in the manner already represented in FIG. 4 by reference numeral 56. Fine filter element 53 on the other hand is made of a soft fabric material and is folded into pleats 55 in the manner shown in FIG. 6 in order to increase its surface area to volume ratio. Thus dirty air entering collection chamber 20 passes firstly through pores 56 in course filter 51 before encountering pleats 55 of fine filter element 53 and exiting collection chamber 20 via a clean air outlet 21 formed in its end face 24.

As can also be seen from FIG. 6, course filter element 51 comprises a circumferential flange 57 which is retained by a lip 25 formed on end face 24 of collection chamber 20. Course filter element 51 is therefore free to rotate about central axis Y-Y'. Fine filter element 53 on the other hand comprises an annular frame 58 which is attachable to end face 24, such that fine filter element 53 is held immovable in collection chamber 20. Course filter element 51 further comprises a number of wings 59 formed on the inner surface thereof which overlap with the pleats 55 of fine filter element 53. Thus if a user rotates filter cleaning wheel 74 about axis Y-Y', tangs 70 provided on the interior face 68 of door 60 which are coupled to filter cleaning wheel 74 are caused to rotate in the same direction, and push against tangs 72 provided on the end face 52 of course filter element 51. This in turn causes course filter element 51 to rotate about central axis Y-Y' by flange 57 sliding under lip 25, and the wings 59 of the course filter element to ride over successive pleats 55 of fine filter element 53. This agitates fine filter element 53, thereby dislodging fine dust adhering to fine filter element 53, which falls through the pores 56 formed in course filter element 53 and is deposited in collection chamber 20. This has the effect of cleaning fine filter element 53 of fine dust. Course filter element 51 may also be cleaned of larger dirt particles because the stiff plastics material of which it is made is also resilient. This allows a user to flex course filter element 51 until flange 57 disengages from under lip 25, and to remove the course filter element from collection chamber 20 through door 60. Course filter element 51 may then be cleaned (for example, by washing) and replaced. When course filter element 51 is removed from collection chamber 20, this also gives a user direct access to fine filter element 53, which may be detached from end face 24 and also removed through door 60. Finally, FIG. 6 also shows how door 60 is maintained in an airtight seal when in the closed condition by the provision of an annular sealing element 65 permanently attached to the interior face 68 of door 60. Sealing element 65 is made of a resilient elastomeric material, such as rubber, which deforms elastically when compressed between door 60 and collection chamber 20.

Figure 7:
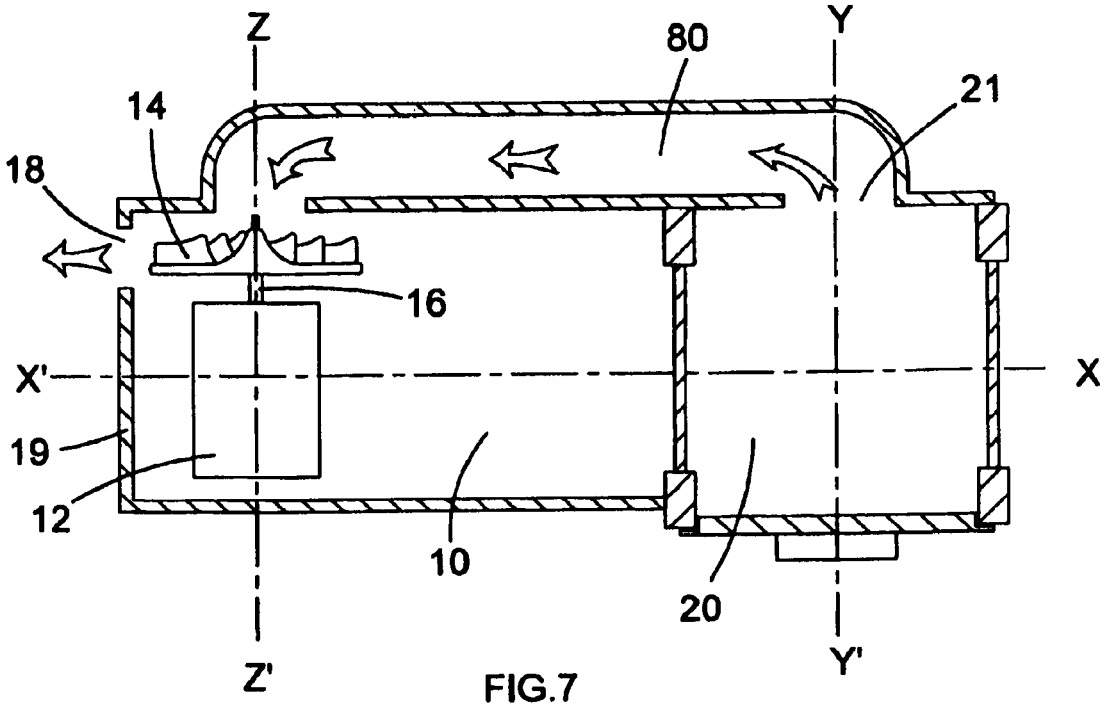
FIG. 7 is a schematic plan view of the main body and collection chamber of a hand-holdable vacuum cleaner according to a sixth embodiment of the invention.

FIG. 7 shows the main body 10 and collection chamber 20 of a hand-holdable vacuum cleaner according to another embodiment of the invention, in which main body 10 houses both a motor 12 and a fan 14 mounted on an output shaft 16 of the motor 10. In this embodiment, motor 12 and fan 14 are oriented in the main body 10 with the output shaft 16 and the axis of rotation of the fan 14 aligned on an axis Z-Z', which is parallel to the central axis Y-Y' of collection chamber 20 and at right angles to a main axis X-X' of the vacuum cleaner. Clean air outlet 21 of collection chamber 20 is also linked to main body 10 via a duct 80, which transports clean air during operation of the vacuum cleaner in the direction indicated by the arrows in FIG. 7 and onto the face of fan 14. Fan 14 is configured as an impeller, such that when the fan rotates, air is drawn in axially thereto and expelled radially therefrom. Main body 10 further comprises an exhaust vent 18 formed on a rear end 19 thereof. Thus when the pivotable nose of the vacuum cleaner (which is not shown in FIG. 7) is in a fully extended position, at 180 degrees to the main axis X-X' of the vacuum cleaner and at a location to the right of FIG. 7, exhaust vent 18 is located opposite to the dirty air inlet to the nose. Air expelled by the fan 14 during operation of the vacuum cleaner therefore travels in a straight-line path out of exhaust vent 18 in completely the opposite direction to the dirty air inlet to the nose and away from a surface to be cleaned. The space in main body 10 between motor 12 and fan 14 on the one hand and collection chamber 20 on the other is occupied in this embodiment by a bank of rechargeable electric cells (not shown in FIG. 7) to power the motor 12 of the vacuum cleaner, which is a rechargeable model in this embodiment. In an alternative embodiment to that shown in FIG. 7, motor 12 may instead be mains powered, in which case the main body 10 houses an electrical transformer instead of a bank of rechargeable electric cells. In either case, however, main body 10 is adapted to fit the contents thereof as compactly as possibly, thereby minimizing the length of duct 80 and the overall length of main body 10. In particular, motor 12 and fan 14 may be located next to collection chamber 20 and a bank of rechargeable electric cells or an electrical transformer, as appropriate, being located either above or below the motor 12 and fan 14, in order to make the length of duct 80 as short as possible, whilst also allowing exhaust vent 18 to be provided on a rear end 19 of main body 10.

Figure 8:
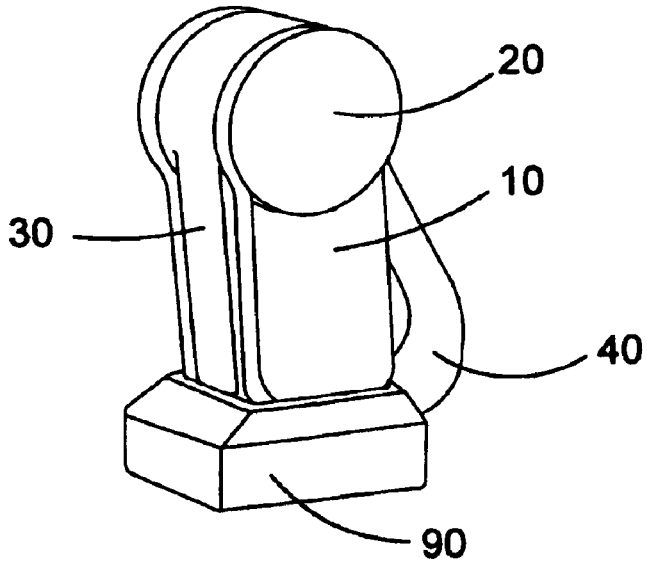
FIG. 8 is a schematic perspective view of a hand-holdable vacuum cleaner according to a seventh embodiment of the invention, shown with the pivotable nose thereof in the 0 degree position relative to the main axis of the vacuum cleaner and standing on a recharging unit.

Finally, FIG. 8 shows an embodiment of the invention in which the vacuum cleaner is rechargeable and has been stood on the rear end 19 of the main body 10 thereof. FIG. 8 also shows this vacuum cleaner in a condition in which its nose 30 has been pivoted to its folded-back position at 0 degrees to the main axis of the vacuum cleaner, in order to give the vacuum cleaner a very compact overall profile. Moreover, rear end 19 of main body 10 comprises means, such as a jack plug (not visible in FIG. 8), for connecting the vacuum cleaner to a recharging unit 90, which allows the vacuum cleaner to be stood on recharging unit 90 on its rear end 19 for recharging.

The invention claimed is:

[1. A hand-holdable vacuum cleaner comprising:

an electric motor (12);

an electrical on-off switch (42) for operating said motor;

a fan (14) connected to an output shaft (16) of said motor;

an airflow pathway comprising an inlet for dirty air (32), an outlet for clean air, and a collection chamber (20) located in fluid communication between said inlet and said outlet;

means for separating out debris entrained with dirty air entering via said inlet and depositing the debris in said collection chamber; and means for adjusting an angle of said inlet relative to a main axis (X-X') of said vacuum cleaner;

characterized by:

a rigid, elongate nose (30) having said inlet at one end thereof, said nose being pivotable relative to said main axis (X-X') through an angle of at least 135 degrees.]

[2. A vacuum cleaner according to claim 1, wherein the nose (30) is pivotable relative to the main axis (X-X') of the vacuum cleaner through an angle of more than 180 degrees.]

[3. A vacuum cleaner according to claim 1, wherein:

the nose (30) or a part (22) of the vacuum cleaner rigidly connected thereto comprises first engagement means;

a part (24,26) of the vacuum cleaner rigidly connected to a main body (10) thereof housing the motor and the fan comprises second engagement means adapted to engage with said first engagement means; and the vacuum cleaner further comprises a resiliently biassed button (34) operable to disengage the first engagement means from the second engagement means.]

[4. A vacuum cleaner according to claim 3, wherein the nose (30) further comprises a rigid telescopic extension tube (38).]

[5. A vacuum cleaner according to claim 1, wherein:

the separating means comprises a filter (50) located within the collection chamber (20);

the collection chamber (20) has a substantially cylindrical shape about a central axis (Y-Y') oriented at right angles to the main axis (X-X') of the vacuum cleaner;

the filter (50) is arranged in an axially symmetric fashion concentric with the central axis (Y-Y') of the collection chamber (20);

the pivotable nose (30) is arranged to pivot about the central axis (Y-Y') of the collection chamber;

a dirty air outlet (36) from the nose (30) is arranged to enter the collection chamber (20) on a cylindrical side wall (28) thereof; and a clean air outlet (21) from the collection chamber (20) is located within said filter (50).]

[6. A vacuum cleaner according to claim 5, wherein the filter (50) has a conical or frusto-conical shape.]

[7. A vacuum cleaner according to claim 5, wherein the collection chamber (20) comprises a hinged door (60) on an end face (26) thereof opposite to said clean air outlet (21).]

[8. A vacuum cleaner according to claim 7, wherein the door (60) is held by a main body (10) of the vacuum cleaner which houses the motor (12) and the fan (14).]

[9. A vacuum cleaner according to claim 8, wherein:

the filter (50) located within the collection chamber (20) is rotatable relative to the door (60) when the nose (30) is pivoted;

an interior face (68) of the door (60) is provided with a series of radial tangs (70);

an end face (52) of the filter (50) adjacent to the interior face (68) of the door (60) has a corresponding set of radial tangs (72); and the combined height of the tangs (70, 72) on the interior face of the door and on the end face of the filter is greater than the separation between the interior face (8) of the door and the end face (52) of the filter.]

[10. A vacuum cleaner according to claim 7, wherein:

the filter (50) is held immovable relative to the main body (10) of the vacuum cleaner during operation thereof;

the door (60) is rotatable relative to the filter (50) when the nose (30) is pivoted;

an interior face (68) of the door is provided with a series of radial tangs (70);

an end face (52) of the filter adjacent to the interior face of the door has a corresponding set of radial tangs (72); and the combined height of the tangs (70, 72) on the interior face of the door and on the end face of the filter is greater than the separation between the interior face (68) of the door and the end face (52) of the filter.]

[11. A vacuum cleaner according to claim 5, wherein:

the collection chamber (20) comprises a door on the cylindrical side wall (28) thereof;

the filter (50) and an end face (26) of the collection chamber opposite to the clean air outlet (21) are rotatable relative to each other when the nose (30) is pivoted;

an interior surface of the end face (26) of the collection chamber is provided with a series of radial tangs (70);

an end face (52) of the filter adjacent to the interior surface of the end face (26) of the collection chamber has a corresponding set of radial tangs (72); and the combined height of the tangs (70, 72) on the interior surface of the end face of the collection chamber and on the end face of the filter is greater than the separation between the interior surface of the end face (26) of the collection chamber and the end face (52) of the filter.]

[12. A vacuum cleaner according to claim 5, wherein the filter (50) is removable and replaceable.]

[13. A vacuum cleaner according to claim 5, wherein the filter (50) comprise a plurality of filter elements (51, 53).]

[14. A vacuum cleaner according to claim 5, wherein the motor (12) and the fan (14) are oriented in the main body (10) of the vacuum cleaner with the output shaft (16) of the motor and the fan's axis of rotation (Z-Z') parallel to the central axis (Y-Y') of the collection chamber (20) and at right angles to the main axis (X-X') of the vacuum cleaner.]

[15. A vacuum cleaner according to claim 14, wherein the fan (14) is configured as an impeller and the main body (10) of the vacuum cleaner comprises one or more exhaust vents (18) on the rear (19) thereof, in a location opposite to the dirty air inlet (32) of the pivotable nose (30) when the nose is in a fully extended position at 180 degrees to the main axis (X-X') of the vacuum cleaner.]

[16. A vacuum cleaner according to claim 1, wherein the vacuum cleaner is adapted to stand on a rear end (19) of the main body (10) of the vacuum cleaner.]

[17. A vacuum cleaner according to claim 16, wherein the vacuum cleaner is a rechargeable model, and the rear end (19) of the main body (10) of the vacuum cleaner comprises means for connecting the vacuum cleaner to a recharging unit (90).]

[18. A vacuum cleaner according to claim 1, wherein the nose comprises a one-way valve in the form of a hinged flap composed of a resilient material.]

[19. A recharging unit (90) adapted to recharge a vacuum cleaner according to claim 17.]

*20. A hand-holdable vacuum cleaner comprising:*

*a main body portion having a side surface and a rigid elongated nose portion pivotable relative to said main body portion;*

*an electric motor disposed in said main body portion;*

*a fan connected to an output shaft of said motor; and*

*an airflow pathway comprising an inlet for dirty air, an outlet for clean air, and a collection chamber located in fluid communication between said inlet and said outlet;*

*wherein said rigid elongated nose portion has said inlet at one end thereof and is pivotable between a use position wherein said inlet extends away from said main body portion and a storage position wherein said rigid elongated nose portion is positioned over substantially its entire length alongside said side surface of said main body portion.*

*21. The hand-holdable vacuum cleaner of claim 20, wherein said side surface comprises the bottom surface of said main body portion.*

*22. The hand-holdable vacuum cleaner of claim 21, wherein the bottom surface of said main body portion has a groove formed therein for receiving said rigid elongated nose portion in said storage position.*

*23. The hand-holdable vacuum cleaner of claim 20, wherein said main body portion has a main axis (X-X') and further wherein said rigid elongated nose portion is pivotable about an axis perpendicular to said main axis (X-X').*

*24. The hand-holdable vacuum cleaner of claim 20, wherein said main body portion has a main axis (X-X') and in said storage position said rigid elongated nose portion is aligned substantially parallel to said main axis (X-X').*

*25. The hand-holdable vacuum cleaner of claim 23, wherein said rigid elongated nose portion is pivotable from said storage position through an angle of at least 135° to a plurality of use positions.*

*26. The hand-holdable vacuum cleaner of claim 23, wherein said rigid elongated nose portion is pivotable from said storage position through an angle of more than 180° to a plurality of use positions.*

*27. A hand-holdable vacuum cleaner comprising:*

*a main body portion having a main axis (X-X') and a rigid elongated nose portion pivotable relative to said main body portion;*

*an electric motor disposed in said main body portion;*

*a fan connected to an output shaft of said motor; and*

*an airflow pathway comprising an inlet for dirty air, an outlet for clean air, and a collection chamber located in fluid communication between said inlet and said outlet;*

*wherein said rigid elongated nose portion has said inlet at one end thereof and is pivotable between a use position at an angle of at least 90° relative to said main axis (X-X') and a storage position at an angle of approximately 0° relative to said main axis (X-X').*

*28. The hand-holdable vacuum cleaner of claim 27, wherein said rigid elongated nose portion is pivotable about an axis perpendicular to said main axis (X-X').*

*29. The hand-holdable vacuum cleaner of claim 27, wherein said main body portion has a bottom surface and further wherein in said storage position said rigid elongated nose portion is positioned over substantially its entire length alongside said bottom surface.*

*30. The hand-holdable vacuum cleaner of claim 29, wherein the bottom surface of said main body portion has a groove formed therein for receiving said rigid elongated nose portion in said storage position.*

*31. The hand-holdable vacuum cleaner of claim 28, wherein said rigid elongated nose portion is pivotable from said storage position through an angle of at least 135° to a plurality of use positions.*

*32. The hand-holdable vacuum cleaner of claim 28, wherein said rigid elongated nose portion is pivotable from said storage position through an angle of more than 180° to a plurality of use positions.*

*33. A hand-holdable vacuum cleaner comprising:*

*a main body portion having a main axis (X-X') and a rigid elongated nose portion pivotable relative to said main body portion;*

*an electric motor disposed in said main body portion;*

*a fan connected to an output shaft of said motor; and*

*an airflow pathway comprising an inlet for dirty air, an outlet for clean air, and a collection chamber in fluid communication between said inlet and said outlet and located at the intersection of the elongated nose portion and main body.*

*34. The hand-holdable vacuum cleaner of claim 33, wherein the collection chamber includes a filter.*

*35. The hand-holdable vacuum cleaner of claim 33, wherein the electric motor is powered by batteries located in the main body.*

* * * * *